US008761682B2

(12) United States Patent
Chin

(10) Patent No.: US 8,761,682 B2
(45) Date of Patent: Jun. 24, 2014

(54) DISTRIBUTED INTERFERENCE MANAGEMENT

(75) Inventor: Woon Hau Chin, Bristol (GB)

(73) Assignee: Kabushiki Kaisha Toshiba, Tokyo (JP)

(*) Notice: Subject to any disclaimer, the term of this patent is extended or adjusted under 35 U.S.C. 154(b) by 72 days.

(21) Appl. No.: 13/495,133

(22) Filed: Jun. 13, 2012

(65) Prior Publication Data

US 2012/0315892 A1 Dec. 13, 2012

(30) Foreign Application Priority Data

Jun. 13, 2011 (GB) .................................. 1109937.1

(51) Int. Cl.
*H04B 1/00* (2006.01)
(52) U.S. Cl.
USPC ....... 455/63.1; 455/423; 455/501; 455/114.2; 370/330; 342/159
(58) Field of Classification Search
USPC ........ 455/69, 63.1, 86, 524, 522, 78, 75, 423, 455/114.2, 296, 501; 370/342, 330; 375/E1.002, 296, 290, 348, 350; 348/21; 342/44, 51, 159
See application file for complete search history.

(56) References Cited

U.S. PATENT DOCUMENTS

| 5,448,754 | A | 9/1995 | Ho et al. | |
|---|---|---|---|---|
| 7,457,590 | B2* | 11/2008 | Frank | 455/69 |
| 8,364,152 | B2* | 1/2013 | Rajasimman et al. | 455/442 |
| 2002/0111163 | A1* | 8/2002 | Hamabe | 455/425 |
| 2003/0045242 | A1* | 3/2003 | Cho | 455/67.1 |
| 2003/0076895 | A1* | 4/2003 | Kranz | 375/296 |
| 2004/0132460 | A1* | 7/2004 | Lee | 455/453 |
| 2006/0223440 | A1* | 10/2006 | Stockton | 455/63.1 |
| 2006/0262009 | A1* | 11/2006 | Watanabe et al. | 342/159 |
| 2006/0268785 | A1* | 11/2006 | Park et al. | 370/331 |

(Continued)

FOREIGN PATENT DOCUMENTS

| GB | 2469465 A | 10/2010 |
|---|---|---|
| GB | 2474842 A | 5/2011 |

(Continued)

OTHER PUBLICATIONS

Office Action issued May 21, 2013, in Japanese Patent Application No. 2012-133182 (with English-language translation).

(Continued)

*Primary Examiner* — Mahendra Patel
(74) *Attorney, Agent, or Firm* — Oblon, Spivak, McClelland, Maier & Neustadt, L.L.P.

(57) ABSTRACT

A method of interference management in a wireless network includes determining a level of interference within a wireless receiver and transmitting a signal indicative of excessive interference. Within a wireless transmitter, a beam forming vector or a sub-set of transmitter antenna is randomly selected from a set of transmitter antenna available to the transmitter and switching signal transmission from a preceding transmission mode to a transmission mode using the selected beam-forming vector or the selected antenna sub-set, following receipt of a signal indicative of excessive interference. It is then determined, within the receiver, whether a level of interference has improved since the transmission of the signal. If not, a signal indicative of a deterioration of said level of interference is sent. If the signal indicative of a deterioration of the level of interference is received at the transmitter, the transmitter reverts to using the preceding transmission mode for signal transmission.

9 Claims, 3 Drawing Sheets

(56) References Cited

U.S. PATENT DOCUMENTS

| | | | |
|---|---|---|---|
| 2007/0213011 | A1 | 9/2007 | Kim et al. |
| 2008/0151832 | A1 | 6/2008 | Iwasaki |
| 2009/0291690 | A1 | 11/2009 | Guvenc et al. |
| 2010/0197309 | A1* | 8/2010 | Fang et al. .................. 455/436 |

FOREIGN PATENT DOCUMENTS

| | | |
|---|---|---|
| JP | 2003-204283 | 7/2003 |
| JP | 2006-086623 | 3/2006 |
| JP | 2010-171816 | 8/2010 |
| WO | WO 03/017690 | 2/2003 |
| WO | WO 2009/070606 A2 | 6/2009 |
| WO | WO 2009/0157706 A2 | 12/2009 |
| WO | WO 2009/157706 A3 | 12/2009 |

OTHER PUBLICATIONS

Office Action issued Sep. 23, 2011, in United Kingdom Patent Application No. GB1109937.1.

Kyongkuk Cho, et al., "Resource Alloation for Orthogonal and Co-Channel Femtocells in a Hierarchical Cell Structure", The 13$^{th}$ IEEE International Symposium on Consumer Electronics, ISCE, 2009, pp. 655-656.

G. J. Foschini, et al., "Coordinating multiple antenna cellular networks to achieve enormous spectral efficiency", MIMO Wireless and Mobile Communications, IEEE Proc.-Commun., vol. 153, No. 4, Aug. 2006, pp. 548-555.

Raghuraman Mudumbai, et al., "Distributed Transmit Beamforming: Challenges and Recent Progress", Cooperative and Relay Networks, IEEE Communications Magazine, vol. 47, No. 2, Feb. 2009, pp. 102-110.

* cited by examiner

DISTRIBUTED INTERFERENCE MANAGEMENT

FIELD

Embodiments described herein generally relate to methods of interference management.

BACKGROUND

As a consequence of higher demand for data traffic in cellular systems, there is an increasing trend towards a denser deployment of base stations or access points to increase the data rate of users. As a result, new deployment models, such as femtocells have been considered by many mobile operators as critical factors in the growth of the cellular market.

However, dense deployment of base stations or access points comes with their own set of problems, of which, the most significant is inter-cell interference. Interference that comes with dense home deployments may have to be solved before such deployment scenarios can be seriously considered.

For femtocellular deployments, there are two main interference scenarios which operators are especially concerned with. The first, is the downlink interference a femtocell access point (FAP) can cause to user equipments (UEs) attached to another macrocell base station (MBS) (from now on denoted as macrocell UE or MUE) due to the utilization of the same frequency spectrum as shown in FIG. 1. The second is the uplink interference caused by MUEs to FAPs as shown in FIG. 2.

In interference scenarios, there normally exist one or more interference source(s) or aggressor(s) and, there are two ways of mitigating interference. One is to operate on the interference source or aggressor and modify its transmission characteristics such that the interference felt at the victim is reduced. The other alternative is to change the reception behaviour of the victim such that it is less susceptible to interference from the aggressor.

One method of reducing the interference experienced at the receiver is to carefully plan the frequency allocation in the neighbouring cells so as to minimise interference at the receiver. However, there are some drawbacks of this method. Firstly, it requires extensive exchange of data between the base stations or feedback of a large amount of information to a central server which can coordinate this allocation. Additionally, the frequency reuse factor is worse, hence, the spectrum is used less efficiently. Moreover, this technique is not feasible for femtocell base stations, which do not have the capability to communicate between neighbouring femtocell base stations. Additionally, feedback of large amount of information for such purposes will cripple the home broadband which supports the femtocells.

Coordinated transmission is an alternative to frequency allocation. This method avoids interference by cancelling the interference prior to the transmission. However, such a method requires exchange of a large amount of data between base stations. Consequently, such methods are not feasible for implementation in femtocells.

The problem with using resource allocation or coordinated transmission to resolve interference situation is the amount of prior knowledge they require to complete the task. Both methods require large amounts of knowledge, such as channel state information at multiple locations. For example, to feedback a single channel coefficient to 10 different interference nodes quantised at 8 bits would require 80 bits, and for 20 nodes would require 160 bits. The number of bits required for feedback would scale linearly with the number of interference nodes.

BRIEF DESCRIPTION OF THE DRAWINGS

Embodiment of the present invention will now be described by way of example only and with reference to the accompanying drawings, in which.

DETAILED DESCRIPTION

According to an embodiment there is provided a method of interference management in a wireless network. The method comprises determining, within a wireless receiver, a level of interference in a receiver and transmitting a signal indicative of excessive interference. Within a wireless transmitter a beam forming vector or a sub-set of transmitter antennae is randomly selected from a set of transmitter antennae available to the transmitter. Any random selection method implementable within the transmitter may be used for this selection purpose. Signal transmission is switched from a preceding transmission mode to a transmission mode using the selected beamforming vector or the selected antennae sub-set, after the receipt of a signal indicative of excessive interference. It is then determined, within the receiver, whether a level of interference has improved since the transmission of the signal. If not a signal indicative of a deterioration of said level of interference is sent. If the signal indicative of a deterioration of the level of interference is received at the transmitter, the transmitter reverts to using the preceding transmission mode for signal transmission.

Embodiments described in the following relate to an interference management system that can be implemented in a wireless network, such as a femtocell system. Embodiments require a small amount of information for making an interference mitigating decision and/or require a minimal amount of information exchange with interfering elements.

Femtocells are subject to deployment constraints. Examples of such constraint are that there is no supported method of communication between femtocells through the backhaul and that, for any over the air communication between femtocells, the signalling has to be kept to a minimum as spectrum is expensive and operators wish to minimise the use of frequency resources for enabling coordination between femtocells. Embodiments described hereinafter are suitable for such use with femtocells.

Figure 1:
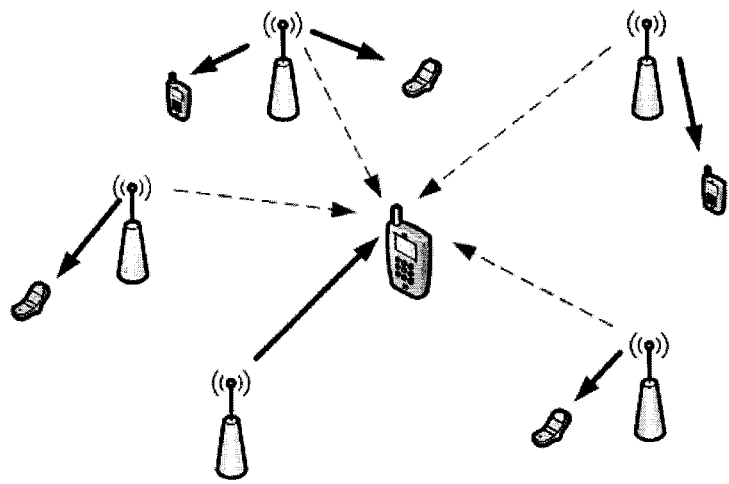
FIG. 1 shows multiple base stations interfering a mobile station.
Figure 2:
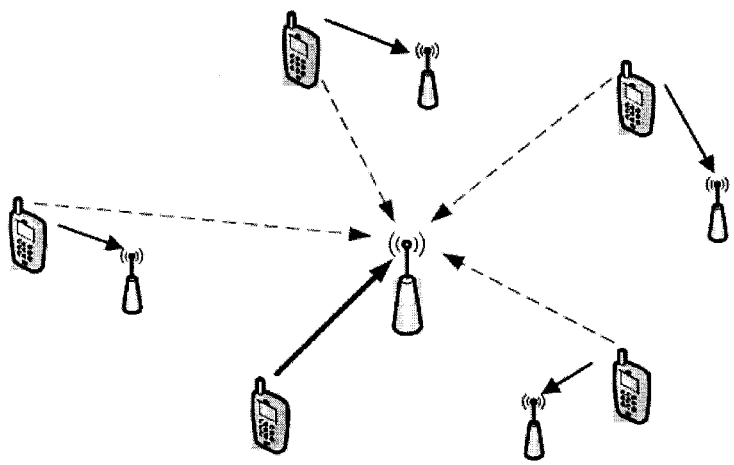
FIG. 2 shows multiple mobile stations causing interference at a base station.

Embodiments described in the following relate to coordinating surrounding transmitters so that their interference to certain equipment is minimised. As shown in FIG. 1 and FIG. 2, this equipment can either be a base station or a mobile terminal. In FIGS. 1 and 2 the links indicated by solid lines denote desired links while the links indicated by dashed lines denote interfering links.

In the embodiments neighbouring interferers within range of the originating node (or node being interfered with) are requested to change their transmission mode according to the originating node's command or signal. In this context, transmission mode refers to the transmit beamforming vector or transmit antenna (for antenna selection case).

The coordinator (or originating node) is the node where interferences are received. If and when the coordinator detects interference the coordinator informs the surrounding interfering nodes. The surrounding nodes then make a random change to their transmission mode (that is they either randomly choose a new beamforming vector or randomly select a different antenna set) and continue transmission using the new transmission mode. Following this change (or indeed after a predetermined fixed delay time after the coordinator has originally informed other equipment within transmission range of the coordinator) the coordinator informs the nodes within range whether or not the level of interference has improved or deteriorated when compared to the previous interference level. Should more interference be received, the coordinator may send a request to the interfering nodes to revert to their previous transmission mode.

While keeping interference low is important the interfering nodes are also expected to maintain their own ongoing communications at an acceptable level. In the embodiments this is achieved by considering the above discussed feedback from originating node while at the same time considering feedback from the node's own associated base station/mobile terminals. Should the change in transmission mode result in an unacceptable deterioration in the quality of ongoing communication, then the node reverts back to the previous transmission mode, irrespective of the feedback received from the coordinator.

While in this embodiment the transmitter checks if the quality of the going communication remains acceptable in the new transmission mode only after feedback from the coordinator has been received, this check can also or alternatively be performed before feedback is received, for example immediately following the switch in transmission mode.

It is expected that situations will exist in which a node receives more than one request to switch transmission mode. Provision is made for this purpose whereby the importance or priority of the request is indicated by the coordinator sending the request. Nodes receiving multiple requests for a change in the transmission mode can then base their reaction on the feedback from the nodes with higher importance. No prioritisation of a change in transmission mode needs to be made if the change in transmission mode is a random change. However, feedback from different coordinating nodes reflecting the usefulness (i.e. achieved interference change) of the change made may be prioritised based on the importance of the received request.

A random change in the selected set of antennae or the selected beam forming vector will change the level of interference experienced by the coordinator. Ideally the transmit beam of the interferer is changed so that the coordinator lies in an area of zero signal strength from the interferer, while the ongoing communications by the interferer can continue to be based on communication links with an acceptable signal strength. The process described herein can therefore be considered a beam nulling process.

The signal indicating excessive interference sent from one node to surrounding nodes via the control channel can be as small as 1 bit. In one embodiment, if the signal is set to "1" the signal indicates that excessive interference is being experienced and if the signal is set to "0" then any interference that may be experienced is deemed acceptable. The size of the signal does, however, not have to be 1 bit and maybe somewhat higher, for example 10 bits. A slightly higher bandwidth allows that the signal indicates the importance of the request, through the signal.

Figure 3:
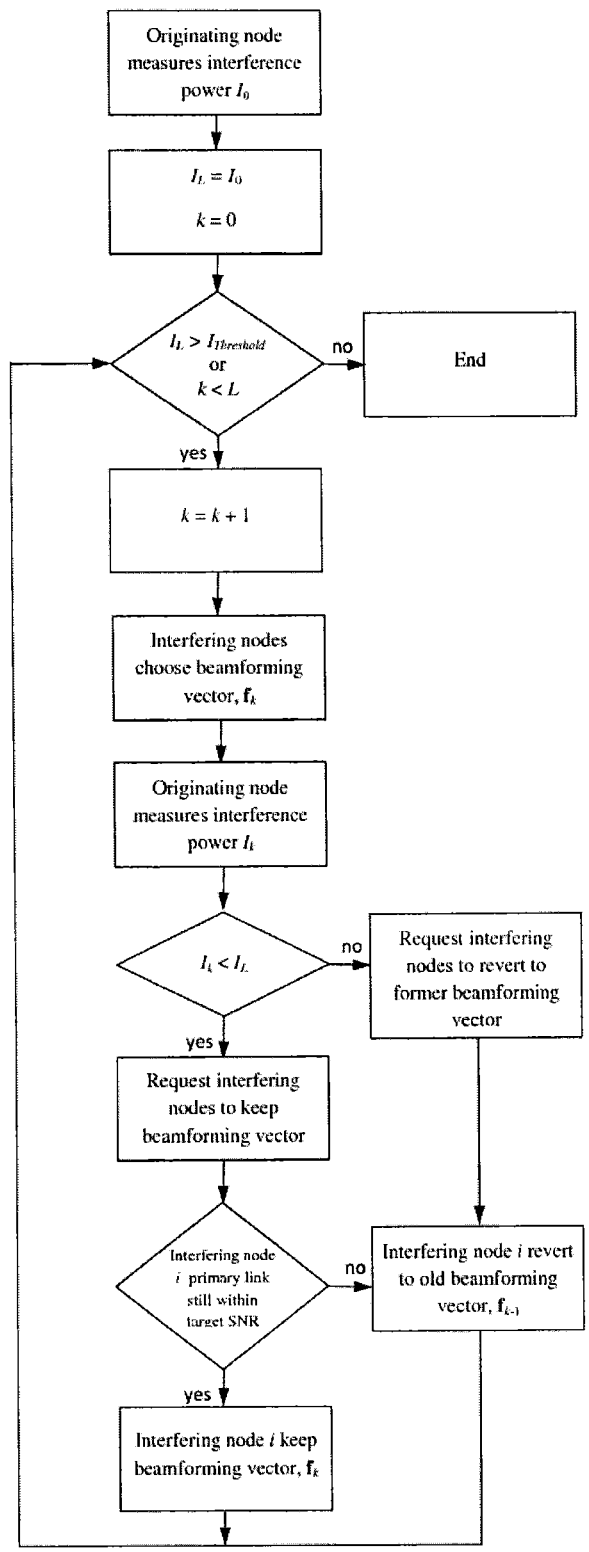
FIG. 3 shows a flow chart of a distributed interference avoidance embodiment.

Table 1 and FIG. 3 provide details of a distributed beam nulling algorithm of an embodiment. The variable k denotes the iteration number of the algorithm, while L denotes the maximum number of iterations the algorithm will run.

TABLE 1

Distributed Beam Nulling Algorithm

Initialisation
Originating node measures interference power, $I_0$
k = 0;
Initialise lowest interference power $I_L = I_0$
Loop
while (k < L) or ($I_L > I_{Threshold}$)
    k = k+1;
    Interfering nodes choose a random beamforming vector or antenna set, $f_k$
    Originating node measures interference power $I_k$
    If $I_k > I_L$
        Broadcast negative signal to all relevant nodes
        Interfering nodes revert to previous beamforming vector or antenna set, $f_{k-1}$
    Else
        Broadcast positive signal to all relevant nodes
        Interfering nodes check if signal strength of their links still fall within acceptable range
        Those with yes, keep current beamforming vector. All others revert to previous beamforming vector or antenna set.
    End
End The nodes may have a set of predetermined beamforming vectors or antenna set (for antenna selection), which they can choose from. They can either choose from a sub-set of beamforming vectors or antenna sets which is likely to provide suitable quality for their primary links, or they can choose from a set of beamforming vectors or antenna set that was defined globally (common set among all base stations/mobiles).

In managing interference in a large network with many nodes, the main problem is coordination, as the feedback required for such networks will be enormous. In the embodiments every node receives the same low rate broadcast on a known and pre-established control channel, hence almost completely removing the large amount of data required to coordinate between nodes.

A control channel is a channel by which nodes exchange control messages to facilitate and coordinate the smooth operation of the data channel. A control channel may, for example, be or comprise any means by which nodes can exchange information suitable for controlling the operating parameters of one or more of the nodes in the network that can communicate with each other through the control channel. A control channel may, for example, be dedicated a frequency band or time slot reserved for the exchange of control information, a code associated with the transmission of control information or any other means by which information for the control of operating conditions in one or more of the nodes within the system can be exchanged or transmitted. A control channel may, for example be implemented by using a particular message format that is recognised by the nodes as comprising control information. The control channel may, in one embodiment, moreover make use of a number of resource blocks from among the resource blocks available to a node for data transmission.

The amount of data exchanged for coordinated management of interference in large networks is reduced considerably in the embodiments, when compared to known interference management methods, such as the above mentioned resource allocation and coordinated transmission approaches. The requirement for a control channel of a type that consumes a large amount of bandwidth for coordinating between the nodes is eliminated by the embodiments. Only a very limited bandwidth is required for coordination in the embodiments. Additionally, the interference reduction resulting from the interference coordination may improve the quality of important communication links.

EXAMPLES

Figure 4:
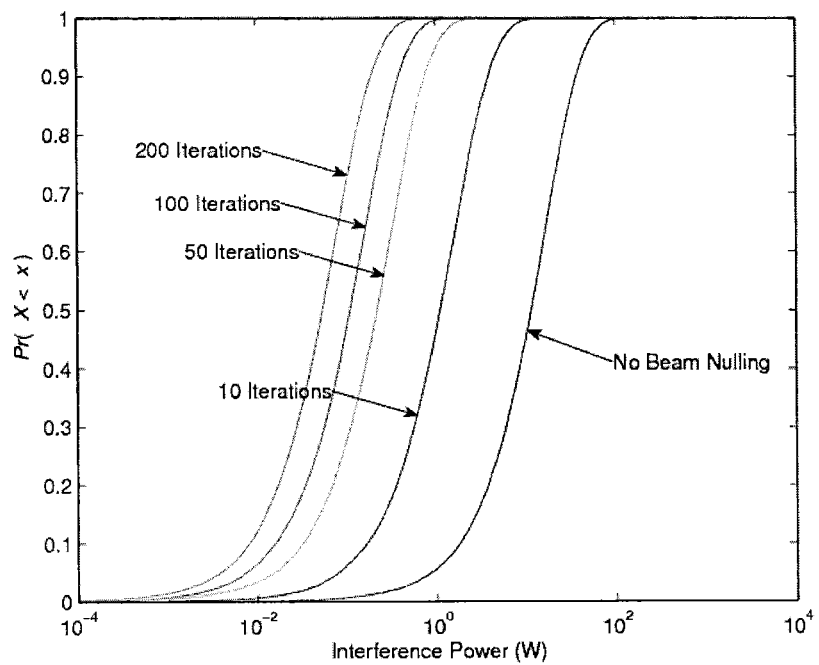
FIG. 4 shows the CDF of Interference Power after Distributed Beam Nulling.

FIG. 4 shows simulation results of the cumulative distribution function of received interference power with and without implementing the interference control algorithm of the above described embodiments. In the simulation it was assumed that 16 interfering nodes with 4 transmit antennas at each of these nodes are present. The algorithm was run for a fixed number of iterations. As can be seen from FIG. 4, the simulation results indicate that the algorithm of the embodiments results in a reduction of received interference power. The amount of interference reduction depends on the number iterations of the algorithm performed. With increasing number of iterations improved interference reduction is achieved. Significant reduction of interference power can be obtained if the algorithm is run for 100 iterations or more.

Figure 5:
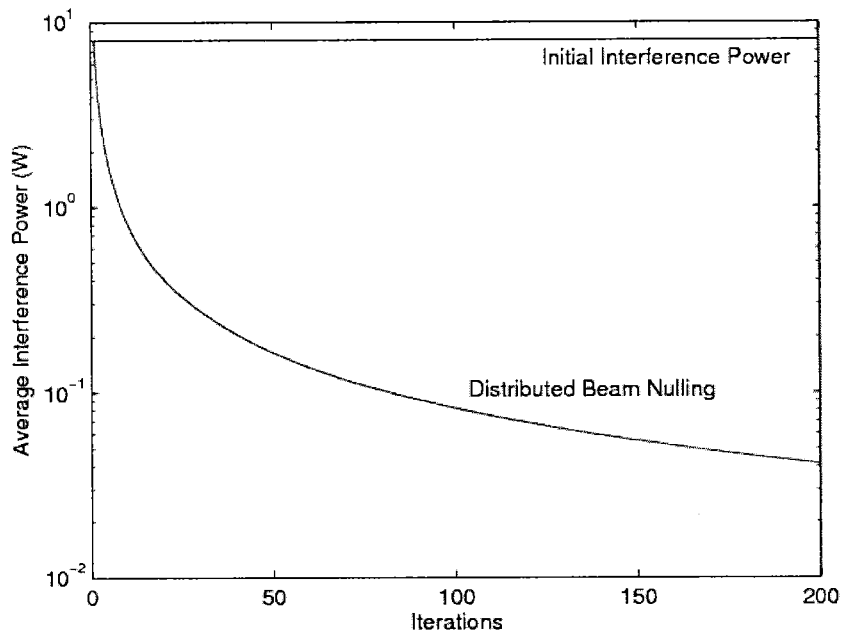
FIG. 5 shows the Mean Interference Power after Distributed Beam Nulling.

FIG. 5 illustrates that the average received interference power decreases with increasing number of iterations. It can be seen that 100 iterations will offer an interference power reduction of up to 80 times, and up to more than 200 times at 200 iterations.

It will be appreciated that, while the above embodiments were described in the context of interference management of femtocell networks, the present invention is not limited to this context. The interference management technique may instead be used in any wireless network to contain or reduce interference.

While certain embodiments have been described, the embodiments have been presented by way of example only, an area not intended to limit the scope of the inventions. Indeed, the novel methods, apparatus and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A method of interference management in a wireless network comprising:
   determining, within a wireless receiver, a level of interference in a receiver and transmitting a signal indicative of excessive interference;
   randomly selecting, within a wireless transmitter upon receipt of a signal indicative of excessive interference, a beam forming vector or a sub-set of transmitter antennae from a set of transmitter antennae available to the transmitter and switching signal transmission from a preceding transmission mode to a transmission mode using the selected beamforming vector or the selected antenna sub-set;
   determining, within the receiver, whether a level of interference has improved since the transmission of said signal and, if not, sending a signal indicative of a deterioration of said level of interference;
   reverting, within the transmitter, to using the preceding transmission mode for signal transmission if a said signal indicative of a deterioration of said level of interference is received;
   within the transmitter, after a said random selection and before or after said signal transmission switching, if no said signal indicative of a deterioration of said level of interference is received, determining whether or not the transmission quality of some or all existing communication links the transmitter is involved in, are above a predetermined threshold value and only retaining, or switching to, the randomly selected transmission mode if the said transmission quality is above said threshold.

2. A method according to claim 1, wherein one or more of said signal indicative of excessive interference and said signal indicative of a deterioration of said level of interference are transmitted via a dedicated control channel.

3. A method according to claim 1, wherein the wireless receiver is arranged to repeatedly transmit signals indicative of excessive interference until an experienced interference level is reduced to below a predetermined threshold or until a predetermined maximum number of said signals has been sent.

4. A method of interference management performed in a wireless transmitter comprising:
   receiving a signal indicative of excessive interference being experienced by a sender of the signal and determined as a level of interference by the sender of the signal;
   randomly selecting, based on the received signal, a beam forming vector or a sub-set of transmitter antenna from a set of transmitter antennae available to the transmitter and switching signal transmission from a preceding transmission mode to a transmission mode using the selected beamforming vector or the selected antennae sub-set;
   reverting to using the preceding transmission mode for signal transmission if a signal indicative of a deterioration of a level of interference determined in the sender is received from the sender;
   after a said random selection and before or after said switching of signal transmission, if no said signal indicative of a deterioration of said level of interference is received, determining whether or not the transmission quality of some or all existing communication links the transmitter participates in, are above a threshold value and only retaining, or switching to, the randomly selected transmission mode if the said transmission quality is above said threshold and otherwise reverting to using the preceding transmission mode.

5. A method according to claim 4, further comprising reverting, within the transmitter, to using the preceding transmission mode for signal transmission if a said signal indicative of a deterioration of said level of interference is received.

6. A wireless transmitter operative to;
   upon receipt of a signal indicating excessive interference determined as a level of interference within a sender of the signal by the sender of the signal, randomly select, based on the received signal, a beam forming vector or a sub-set of transmitter antennae from among a number of available beam forming vectors or from a set of transmitter antennae available to the transmitter and to switch signal transmission from a preceding transmission mode to a transmission mode using the selected beam forming vector or the selected antennae sub-set;

reverting to using the preceding transmission mode for signal transmission if a signal indicative of a deterioration of a level of interference determined in the sender is received from the sender;

within the transmitter, after a said random selection and before or after said signal transmission switching, if no said signal indicative of a deterioration of said level of interference is received, determining whether or not the transmission quality of some or all existing communication links the transmitter is involved in, are above a predetermined threshold value, only retaining, or switching to, the randomly selected transmission mode if the said transmission quality is above said threshold and otherwise reverting to using the preceding transmission mode.

7. A transmitter according to claim 6, further arranged to check, after a said random selection and before or after said switching of the transmission mode, whether or not the transmission quality of some or all existing communication links the transmitter is involved in, are above a threshold value and to only retain or switch to the randomly selected transmission mode if the said transmission quality is above said threshold.

8. A transmitter according to claim 7, wherein said transmitter is one or more of a mobile telephone or other type of user equipment, or a base station.

9. A system comprising:

a wireless receiver comprising an interference detector operative to detect a level of received interference and a transmitter operative to transmit a signal comprising an indication of excessive interference; and a wireless transmitter operative to randomly select, upon receipt of the signal and based on the received signal, a beam forming vector or a sub-set of transmitter antennae from among a number of available beam forming vectors or from a set of transmitter antennae available to the transmitter and to switch signal transmission from a preceding transmission mode to a transmission mode using the selected beam forming vector or the selected antennae sub-set;

reverting to using the preceding transmission mode for signal transmission if a signal indicative of a deterioration of a level of interference determined by the interference detector of the receiver is received at the transmitter from the receiver;

within the transmitter, after a said random selection and before or after said signal transmission switching, if no said signal indicative of a deterioration of said level of interference is received, determining whether or not the transmission quality of some or all existing communication links the transmitter is involved in, are above a predetermined threshold value, only retaining, or switching to, the randomly selected transmission mode if the said transmission quality is above said threshold and otherwise reverting to the preceding transmission mode.

* * * * *